United States Patent [19]
Dey et al.

[11] Patent Number: 5,659,168
[45] Date of Patent: Aug. 19, 1997

[54] RADIOMETRIC CALIBRATION SYSTEM

[75] Inventors: Thomas Willliam Dey, Springwater; Kenneth L. Mason, Fairport, both of N.Y.

[73] Assignee: Eastman Kodak Company, Rochester, N.Y.

[21] Appl. No.: 557,786

[22] Filed: Nov. 13, 1995

[51] Int. Cl.$^6$ ........................................ G01J 1/20
[52] U.S. Cl. ........................ 250/208.1; 356/222
[58] Field of Search .................. 250/208.1, 208.2; 356/218, 222, 225

[56] References Cited

U.S. PATENT DOCUMENTS

| | | | |
|---|---|---|---|
| 4,959,541 | 9/1990 | Boyd | 250/208.1 |
| 5,204,733 | 4/1993 | Deshayes | 356/243 |
| 5,270,528 | 12/1993 | Ogikubo | 250/208.1 |

*Primary Examiner*—Edward P. Westin
*Assistant Examiner*—Kevin Pyo
*Attorney, Agent, or Firm*—Thomas H. Close

[57] ABSTRACT

A radiometric calibration system is proposed to calibrate the sensor array of a space born optical imaging system. The calibration system comprises an occulting plate with an occulting convolution aperture which executes a relative lateral motion with respect to an image of the sun, to effect a deterministic and continuously varying calibration flux level to the sensor array. The shape, size orientation and apodization of the aperture control the functional form of the temporal irradiance function reaching the sensor being calibrated. Continuous calibration functions covering a range from a minimum to a maximum desired flux level are readily achievable.

7 Claims, 4 Drawing Sheets

RADIOMETRIC CALIBRATION SYSTEM

FIELD OF THE INVENTION

The invention relates generally to the field of radiometry, and in particular to radiometric calibration of photodetectors in space employing the sun as a deterministic source of radiation.

BACKGROUND OF THE INVENTION

Planetary imagers, especially orbital earth imagers, are useful for remote sensing of atmospheric composition, geologic morphology and chemistry, crop assessment, weather prediction, and monitoring the activities of man. Monochromatic and multispectral satellite based imagers can quantify properties of the above earth characteristics, provided their solid state detector arrays are properly calibrated it relation to radiometric responsivities.

One prior art method is schematically illustrated in FIG. 2. This method utilizes a radiometric calibration assembly 9 having a an entrance port 14, a flat fold mirror 16, a lens 18, and a perforated plate 30. The perforated plate 30 is shown in detail in FIG. 3. A plurality of small apertures 32, 34, 36, 38 are formed in the otherwise opaque plate. Each aperture is of different size, but each is necessarily smaller than the image of the sun 12 formed by lens 18 (see FIG. 2). In execution of the radiometric calibration, the sun's image is caused to move to, and park upon each aperture in turn. For example, the fold mirror 16 can be steered to place a solar image 40 (see FIG. 3) upon smallest aperture 32, resulting in a discrete lowest calibration flux level being delivered to an imaging sensor array 10. The array responsivity to this flux level is measured and then fold mirror 16 can be steered to next larger aperture 34, resulting in a discrete higher calibration flux level. The array responsivity to a sequence of discrete and increasing flux levels, representative of the range of anticipated imaging flux levels is thus achieved. Detractors from this approach include time wasted in moving the solar image from aperture to aperture, and the disjoint nature of the motion from park to move to park in laborious repetition. Only a small portion of the total calibration time available is actually used in collecting flux measurements, thus detracting from the potential accuracy gainable by statistical averaging if more flux collection time were available. In addition, only one aperture can be geometrically centered, resulting in some differential nonuniformity in the flux level at the imaging array 10, as different apertures are accessed. Lastly, the discrete small number of steps characteristic of the small finite number of apertures necessitates interpolation of the inferred responsivity of the array between calibration steps, degrading accuracy in these regions.

SUMMARY OF THE INVENTION

The present invention is directed to overcoming one or more of the problems set forth above. Briefly summarized, according to one aspect of the present invention, specular feed optics image the sun upon an occulting plate, comprising an aperture in the form of a convolution mask located in the vicinity of the optical pupil of the imaging system. The solar image continuously traverses the occulting plate aperture along a transverse vector, in such a way as to achieve a customized, continuous temporal calibration flux level function. The mechanism for the transverse motion of the solar image relative to the plate aperture may be either the natural angular orbital motion of the satellite, or actuation of a small fold mirror to access the flux arriving at the satellite from the sun. One aspect of the present invention lies in the customized morphology of the aperture in the plate, defined by a mathematical convolution contour function, describing the shape of the edge of the aperture. By selective design of the aperture shape and transmittance, a wide range of desirable calibration functions can be realized. Calibration flux levels that vary linearly, logrithmically or sinusoidally with time can all be realized. The advantage of this approach is that calibration flux becomes available continuously covering a range from a minimum to a maximum desired level, with no skips in levels and no interruption of the calibration from beginning to end. Thus, a most accurate calibration is achieved in a minimum time, freeing the imager to spend a maximum amount of time collecting target data, with the most accurate radiometric information.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
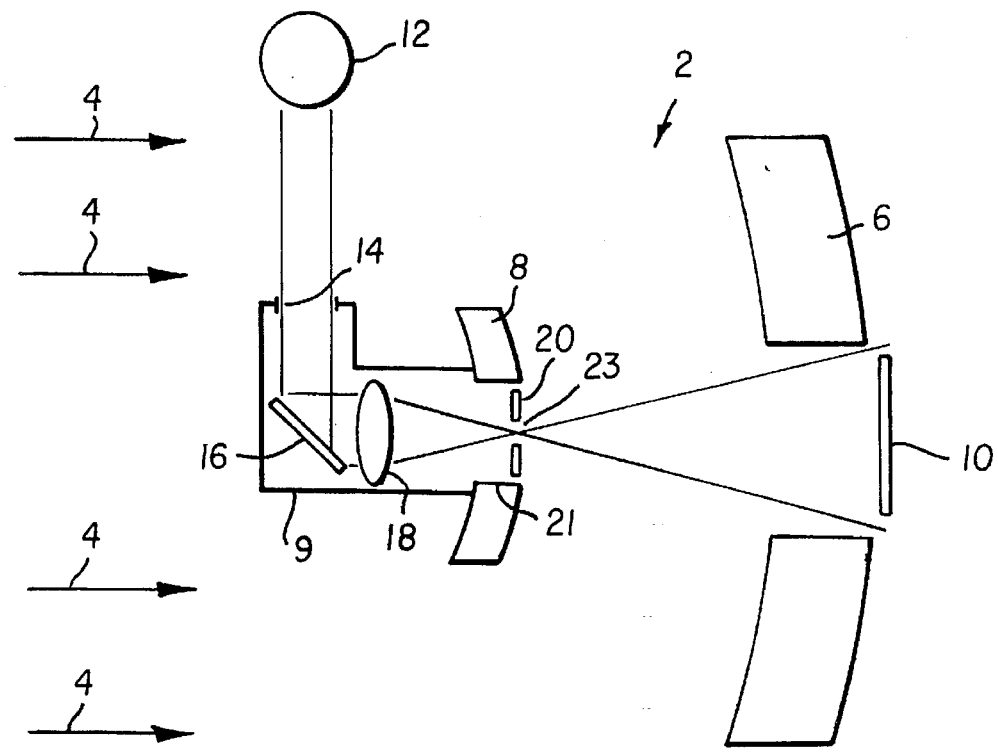
FIG. 1 is a schematic representation of an optical imaging system employing solar feed optics for radiometric calibration using a convolution mask aperture according to the present invention.
Figure 2:
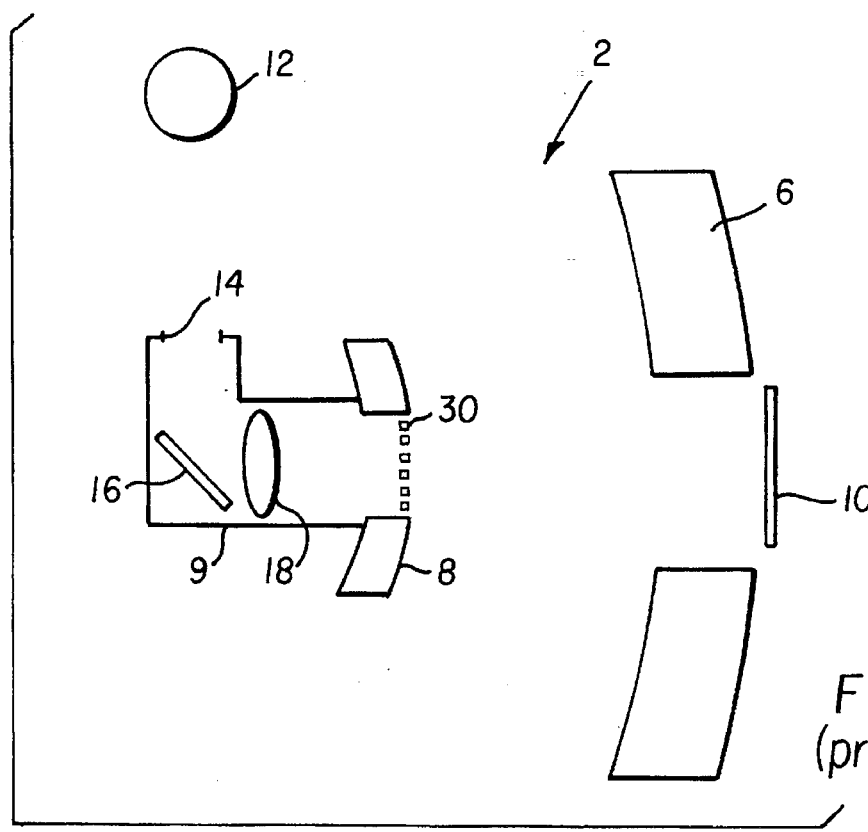
FIG. 2 is a schematic representation of an optical imaging system employing a prior art device for radiometric calibration using a plate comprising a plurality of perforations.
Figure 3:
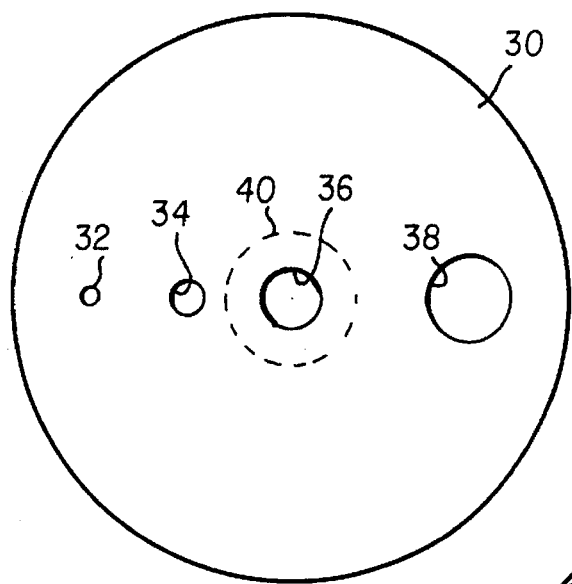
FIG. 3 is a schematic representation of the detailed morphology of the perforated plate used in the prior art device of FIG. 2, and further showing the conjugate image of the sun in the plane of the plate.

Beginning with FIG. 1, an optical imaging system 2 is shown, in the example form of a Ritchey Chretien orbital telescope, used to image the earth's surface for geophysical assessment. Light 4 from the earth falls upon the telescope's primary mirror 6 and is reflected to secondary mirror 8, and is further reflected to imaging sensor array 10, such as a CCD imaging array. The array 10 senses the image of the earth's surface, providing electronic signals to processors to ultimately transmit telemetric signals to the ground controller for reconstruction and evaluation of the image. Because the responsivity of the sensor array elements to light from the ground scene will vary with time, it is desirable to periodically calibrate the array 10 to a deterministic source of variable controlled radiation.

Radiometric calibration assembly 9 performs this calibration function. To accomplish the calibration, the telescope is pointed away from the earth to the darkness of deep space. Light from the sun 12 passes through an entrance port 14 of the optical calibration assembly 9 and then is intercepted by a small flat fold mirror 16. The aperture of the optical calibration assembly is such that the radiometric flux from the sun fills the image plane where sensor 10 is located without vignetting. The solar flux is then reflected to solar imaging lens 18 and then falls on an occulting, plate 20 located at a hole 21 in the secondary mirror 8. A portion of the solar flux passes through a convolution aperture 23 in the occulting plate 20 to illuminate the imaging sensor array 10 with spatially uniform and temporally continuously variable calibration flux. The occulting plate 20 and hence the convolution aperture 23 is located at the focal plane of the calibration lens 18. Either moving the fold mirror 16, or the natural orbital angular motion of the telescope 2 causes the solar image to laterally traverse the aperture 23 in the occulting plate 20, effecting the desired temporal variation of the calibration flux level according to a desired temporal variation function. This is achieved as described in detail below.

Figure 4:
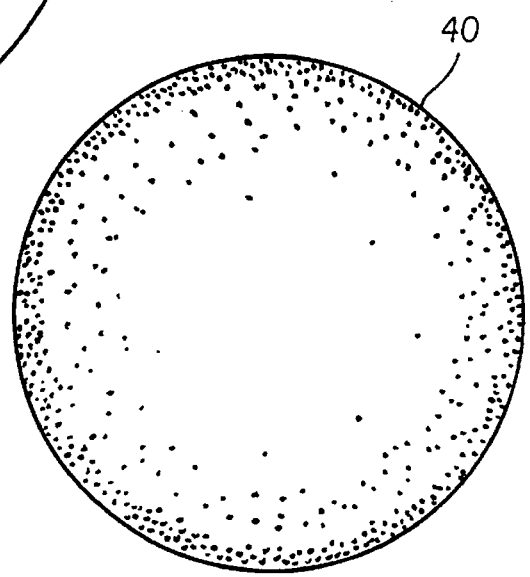
FIG. 4 is a schematic representation of an image of the sun.
Figure 5:
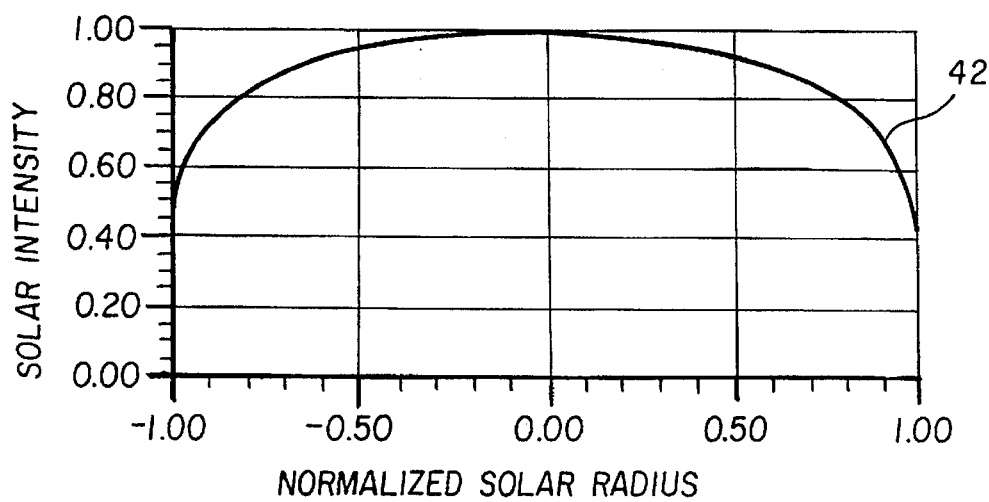
FIG. 5 is a graphical representation of the solar radiation radial polychromatic radiance profile.

To aid in understanding the operation of the calibration system according to the present invention, attention is now drawn to FIG. 4, showing a solar image 40. FIG. 4 illustrates the phenomenon referred to as solar limb darkening. The image is more radiant in the center and darker toward the image edge. FIG. 5 shows a graph 42 of the limb darkening profile across the solar diameter in term of relative solar intensity vs. normalized solar radius. The essence of our invention is to intentionally cause an image of the sun to traverse a relatively large occulting plate aperture. By controlling the motion of this image relative to the occulting plate aperture, we are able to generate a continuously variable and deterministic calibration flux level. This is in stark contrast to the prior art approach wherein the solar image was carefully made to sequentially overfill a plurality of relatively small, discrete apertures.

Figure 6:
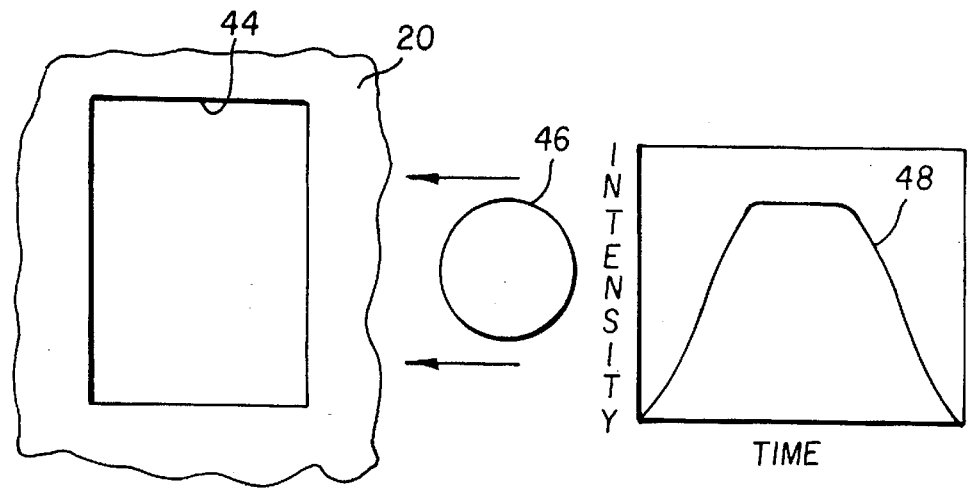
FIG. 6 is a depiction of a first convolution mask aperture and the temporal flux function associated with it.

One example of a convolution occulting plate aperture according to the present invention is shown in FIG. 6. A relatively large rectangular convolution aperture 44 intercepts a continuously moving image 46 of the sun, resulting in a calibration flux function 48 expressed as intensity over time. The generalized relationship determining the form of this function is dictated by the simple convolution equation:

$$R = I_s \otimes A, \quad (1)$$

where: R is the calibration flux function, $I_s$ is the solar intensity distribution function and A is the convolution aperture transmittance function. For the rectangular convolution aperture shown in FIG. 6, A is a rectangular aperture function with unity transmittance (rect $[a,b]$, where a and b are the length and width of the aperture). Other functional forms can be realized as described below by appropriate selection and design of the convolution aperture in the occulting plate 20.

Figure 7:
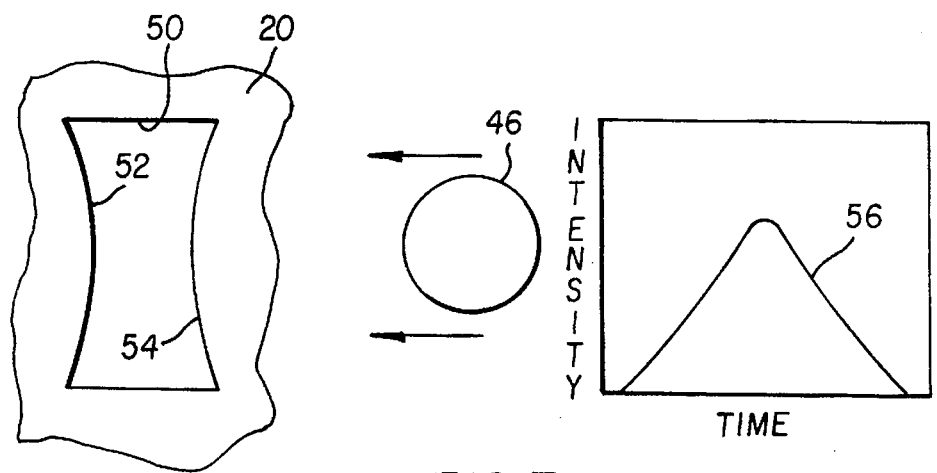
FIG. 7 is a depiction of an alternative convolution mask aperture and the temporal flux function associated with it.
Figure 8:
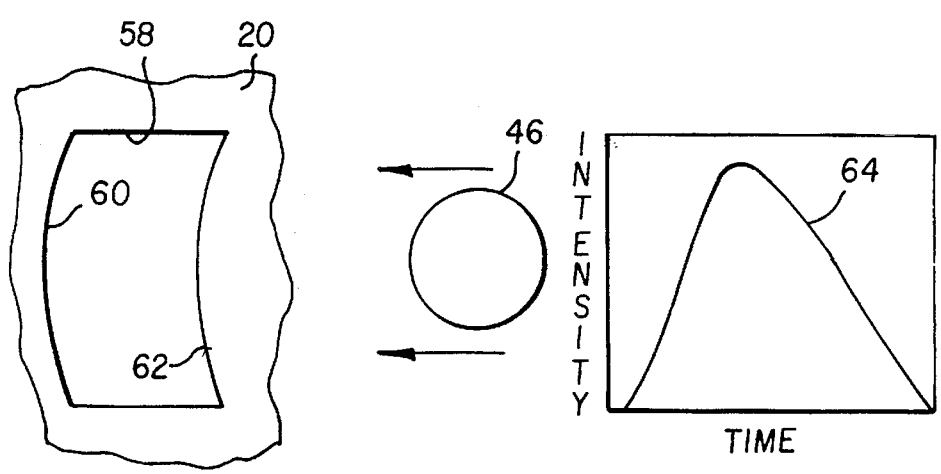
FIG. 8 is a depiction of a further alternative convolution mask aperture and the temporal flux function associated with it.
Figure 9:
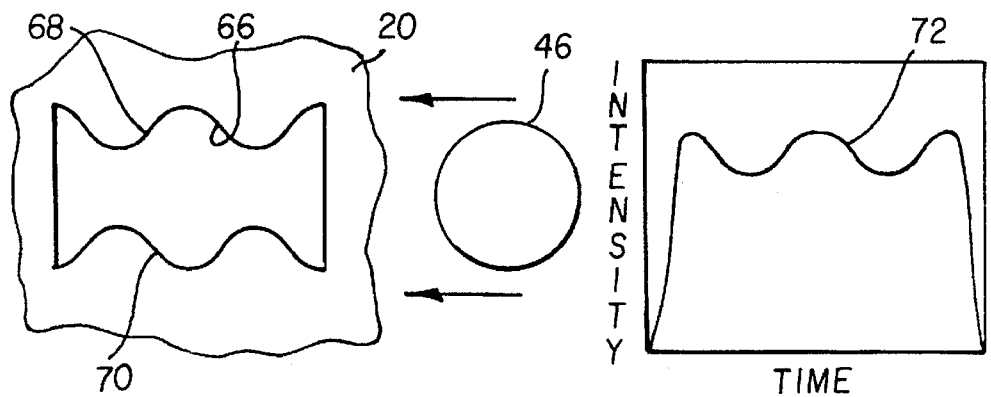
FIG. 9 is a depiction of another alternative convolution mask aperture and the temporal flux function associated with it.

FIG. 7 shows a convolution aperture 50 having rounded edges 52 and 54 defined by circular arcs. The convolution operation results in a calibration flux function 56 with nearly linear ascending and descending portions. Note that the rise and fall rates of the calibration flux function have been modified relative to function 48 of FIG. 6. As a further example, consider FIG. 8. Here, a convolution aperture 58 is designed with asymmetrical rounded edges 60 and 62. This yields an asymmetric calibration flux function 64, with a steeper slope on one side, and a shallower slope on the other, which could be desirable to allow both fast and slow calibration scans. As another example, consider FIG. 9. Here, a convolution aperture 66 is designed with sinusoidal edges 68 and 70. This yields an oscillatory calibration flux function 72 which has the advantage of continuously and multiply sampling a calibration flux level range of particular interest.

Figure 10:
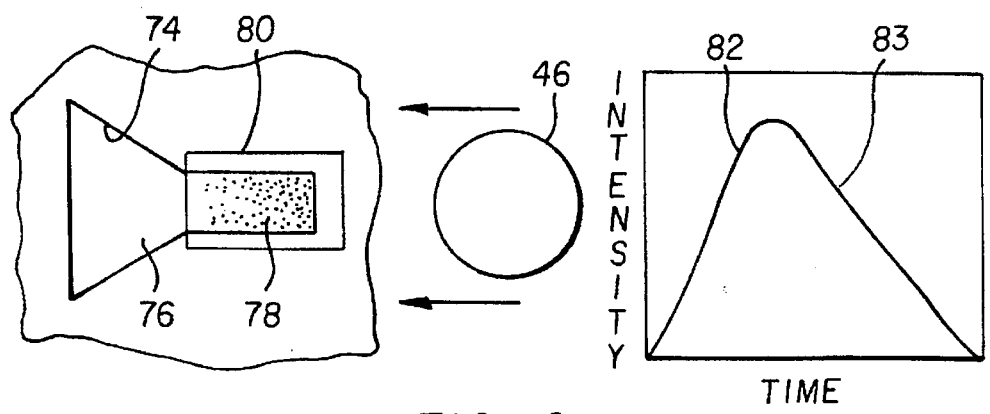
FIG. 10 is a depiction of a presently preferred convolution mask aperture and the temporal flux function associated with it.

Apodizing filters cooperating with the occulting plate aperture may be employed to modulate the radiometric flux passing the pupil. As a final example, refer to FIG. 10. Here, a convolution aperture 74 displays a compound geometry, comprising a wedge shaped region 76 leading to a rectangular region 78. The rectangular region further incorporates an apodizing neutral density filter 80. The effect is to diminish the transmitted flux in a controlled fashion both geometrically and by apodization as the image of the sun 46 transits the convolution aperture 74, relaxing the geometric accuracy required of an otherwise extremely narrow region to a wedged shaped slit terminating in a point. This yields a calibration flux function 82 which covers an especially wide range of calibration flux levels with high accuracy and includes a portion 83 that is linear with respect to time.

By use of the convolution relationship described in equation (1), a multiplicity of customized convolution apertures can be designed to yield a wide variety of desirable radiometric calibration flux functions. Among desirable and designable calibration flux functions are temporally linear, logarithmic, exponential, sinusoidal functions and functions that are designed to optimize the signal to noise ratio of the calibration process across the range of calibration. A calibration flux function that is linear with respect to time has computational and storage efficiency advantages. For example the linear portion may be stored simply as the start and end points of the linear portion of the function, or as the slope and intercept of the linear portion. Similarly, a calibration flux function with a known functional form such as a logarithmic function can be stored as the parameters defining the function, and additionally has the advantage of covering a large range of values.

Figure 11:
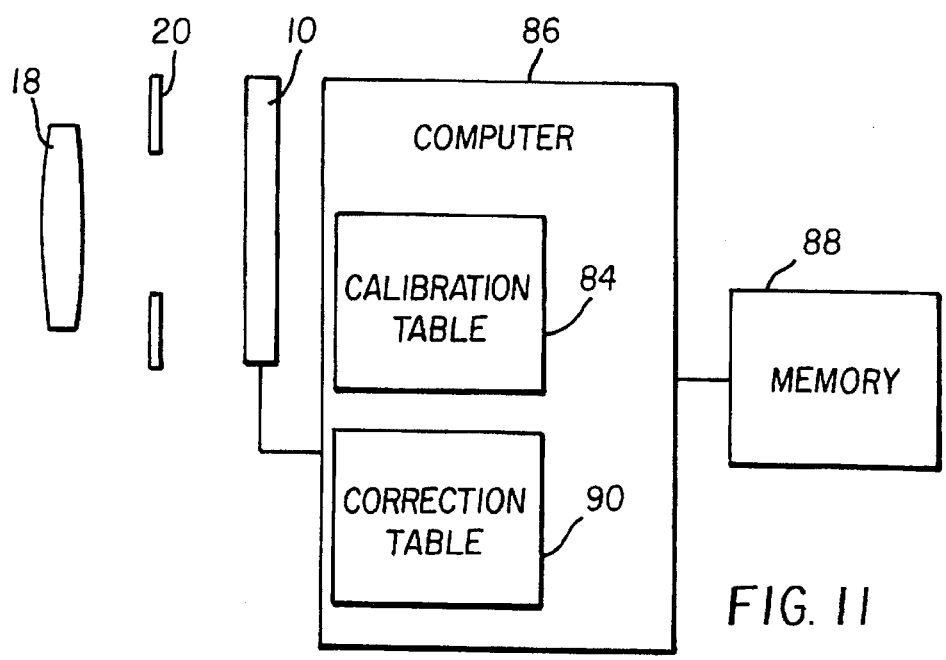
FIG. 11 is a schematic diagram showing the calibration processing apparatus employed with the present invention.

Referring to FIG. 11, the calibration flux function associated with the convolution aperture in occulting plate 20 is calculated and stored in a calibration table 84 associated with a computer 86. When the image sensor 10 is calibrated, the sensor is exposed and read out a plurality of times (e.g. 100–10,000 times during the transition of the sun) while passing an image of the sun across the convolution aperture. The response of the sensor is recorded and stored in a memory 88 associated the computer 86. The response over time of each of the pixels in the image sensor 10 is compared to the calibration flux function stored in calibration table 86 and sensor calibration parameters such as offset and gain value are computed for each sensor element in a known fashion. The sensor calibration parameters are stored in a correction table 90 and later employed to correct the output of the sensor 10.

The invention has been described with reference to preferred embodiments. However, it will be appreciated that variations and modifications can be effected by a person of ordinary skill in the art without departing from the scope of the invention.

PARTS LIST 2 earth imaging system
4 light from earth 6 primary mirror
8 secondary mirror
9 radiometric calibration assembly
10 imaging sensor array
12 light from the sun
14 entrance port
16 fold mirror
18 solar imaging lens
20 occulting plate
21 hole in secondary mirror
23 convolution aperture
30 perforated plate
32 smallest aperture in plate
34 larger aperture in plate
36 small aperture
38 small aperture
40 solar image
42 graph of solar radiance function
44 rectangular convolution aperture
46 image of sun
48 calibration flux function
50 convolution aperture
52 rounded edge
54 rounded edge
56 calibration flux function
58 convolution aperture
60 rounded edge
62 rounded edge
64 calibration flux function
66 convolution aperture
68 sinusoidal edge
70 sinusoidal edge
72 oscillatory calibration flux function
74 convolution aperture
76 wedge shaped region
78 rectangular region
80 apodizing filter
82 calibration flux function
83 linear portion of calibration flux function
84 calibration table
86 computer
88 memory
90 correction table

We claim:

1. Apparatus of the type employing the sun as a deterministic source of radiation for radiometrically calibrating a photodetector array located in the image plane of an imaging system in space, the imaging system defining a pupil, comprising:

a. calibration optics for forming an image of the sun at the pupil of the imaging system such that the radiometric flux from the sun fills the image plane of the imaging system without vignetting;

b. an occulting plate defining a convolution aperture located at the focal plane of the calibration optics; and c. means for providing relative movement between the image of the sun and the occulting plate aperture to continuously modulate the radiometric flux passing the pupil.

2. The apparatus claimed in claim 1, wherein the convolution aperture defines an edge perpendicular to the direction of relative motion of the sun.

3. The apparatus claimed in claim 1, wherein the convolution aperture defines a circular arc.

4. The apparatus claimed in claim 1, wherein the convolution aperture defines a wedged shaped slit portion terminating in a parallel slit portion at the narrow end of the wedge, and further comprising an apodizing filter arranged over the parallel slit portion.

5. The apparatus claimed in claim 1, further comprising an apodizing filter cooperating with the occulting plate aperture to modulate the radiometric flux passing the pupil.

6. The apparatus claimed in claim 5, wherein the apodizing filter and convolution aperture are configured to modulate the radiometric flux passing the pupil linearly as a function of time.

7. The apparatus claimed in claim 1, wherein the convolution aperture is configured to modulate the radiometric flux passing the pupil linearly as a function of time.

* * * * *